United States Patent [19]

Spencer

[11] Patent Number: 4,949,214
[45] Date of Patent: Aug. 14, 1990

[54] TRIP DELAY OVERRIDE FOR ELECTRICAL CIRCUIT BREAKERS

[76] Inventor: George A. Spencer, 1909 Fresno Rd., Plano, Tex. 75074

[21] Appl. No.: 399,151

[22] Filed: Aug. 28, 1989

[51] Int. Cl.$^5$ ............................................... H02H 3/08
[52] U.S. Cl. ........................................ 361/95; 361/96; 361/42
[58] Field of Search ..................... 361/42, 87, 92, 94, 361/95, 96

[56] References Cited

U.S. PATENT DOCUMENTS

| | | | |
|---|---|---|---|
| 3,745,369 | 7/1973 | Yamagata | 361/99 X |
| 3,809,962 | 5/1974 | Brown et al. | 361/95 X |
| 4,001,648 | 1/1977 | Takata et al. | 361/95 X |
| 4,301,491 | 11/1981 | Gryctko | 361/94 X |
| 4,583,004 | 4/1986 | Yearsin | 361/95 X |
| 4,860,153 | 2/1989 | Ishii | 361/93 X |

Primary Examiner—Derek S. Jennings
Attorney, Agent, or Firm—Dennis T. Griggs

[57] ABSTRACT

An automatic override circuit is responsive to the magnitude of instantaneous current flow through a monitored conductor to produce an output signal which can actuate a solenoid or a ground fault interrupter to automatically trip a circuit breaker in repsonse to an excursion of current flow which exceeds a predetermined maximum current overhead level. The short circuit protector can automatically override a thermal trip delay and cause the circuit breaker to trip instantly or delay tripping for a prescribed period of short circuit events which exceed the maximum current overload level. In one embodiment, a control signal is generated which actuates a solenoid which is coupled to a thermal magnetic circuit breaker. In an alternative embodiment, the control signal is utilized for automatically triggering a ground fault interrupter. In both embodiments, the power distribution circuit is interrupted in response to a short circuit condition which would otherwise be tolerated during the thermal trip delay of a conventional circuit breaker.

22 Claims, 5 Drawing Sheets

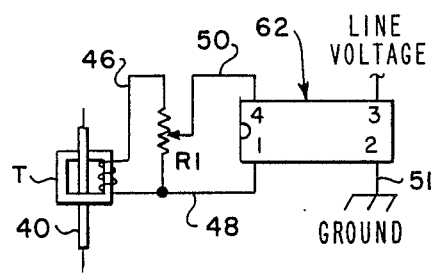
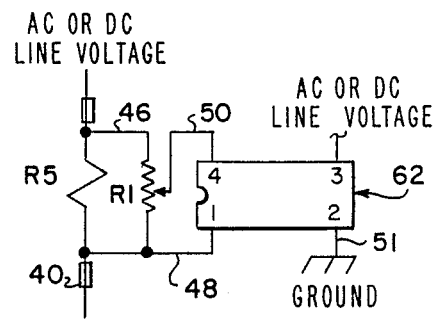
FIG. 13  FIG. 14
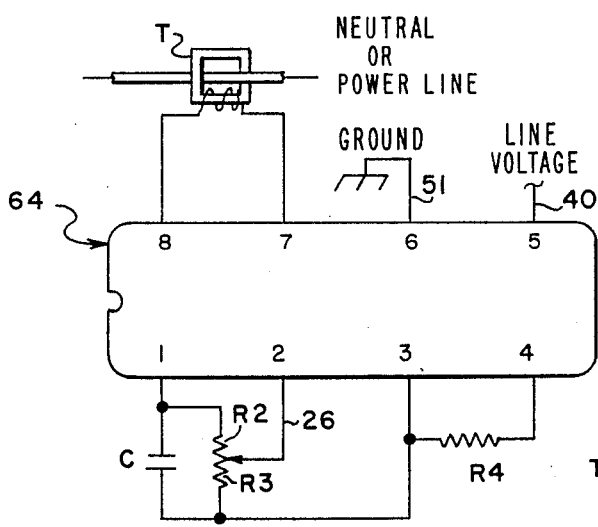
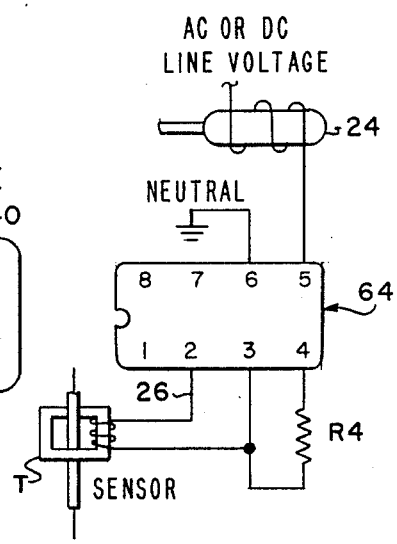
FIG. 15  FIG. 16
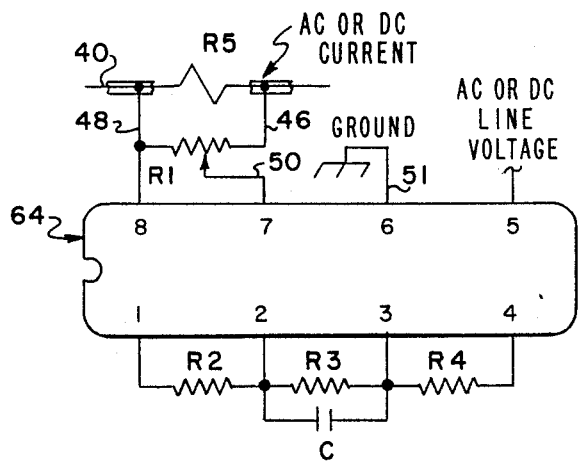
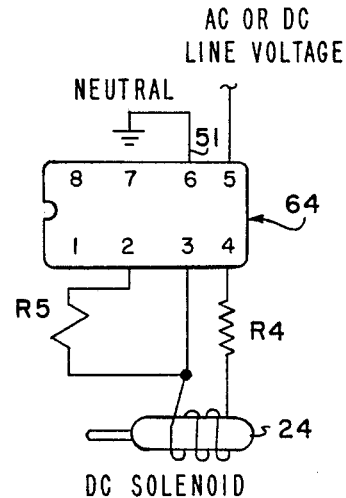
FIG. 17  FIG. 18

TRIP DELAY OVERRIDE FOR ELECTRICAL CIRCUIT BREAKERS

FIELD OF THE INVENTION

This invention relates generally to power distribution circuit protection, and in particular to a protector circuit for automatically overriding the trip delay of a circuit breaker in response to an overloaded circuit condition.

BACKGROUND OF THE INVENTION

When a power distribution circuit is designed, it is important to select a wiring size which will carry the maximum rated current for the expected service as specified by the National Electrical Code (NEC 210-9). Power is distributed by the wiring through circuit breakers which are designed to maintain contact during normal service conditions and for specified limited times under high current flow conditions, for example during start-up of an electrical motor. If the cause of an overload condition has not been corrected and the high current flow condition persists after the limited trip delay interval, the circuit breaker will automatically break the circuit.

When an electrical circuit, or appliance, shorts out, the amount of short circuit current produced can be determined by Ohms law, I=E/R, where "I" is the short circuit current in amps, "E" is the supply line voltage and "R" is the resistance of the wiring. There are three primary factors which effect the resistance R in electrical power distribution systems:

1. the type of wire (aluminum or copper);
2. the size of the wire (gauge); and,
3. the length of the wire.

During an electrical inspection, both the type and size of wire is checked; however, the length is difficult to check since the wiring is hidden behind walls and ceilings. Consequently, wiring length is usually not verified.

Table 1 shows the delays in tripping a circuit breaker for various lengths of wiring circuits which become shorted.

It will be seen that for wire lengths of 100 feet and over the time required to trip the circuit breaker, when a dead short is applied to the wiring or its outlet, is increased. During normal wiring installations, 250 feet of wire is consumed very quickly due to the wiring path: up a wall, across an attic, down a wall, around the room, back to the lights, or over to a switch, for example.

It should also be noted that the recent change made by the National Electrical Code in the resistance standard for wiring, permitting more impurities into the copper for ease of manufacturing, had the effect of reducing the quality of wiring systems by approximately 20%, which further reduces the short circuit current for the same length of wire, thereby increasing the short circuit response time of the circuit breaker.

After a six year study of both commercial and residential wire distribution systems, it has been determined by means of electronic measurements (See U.S. Pat. No. 4,316,187 entitled "Current Rating Verification System" issued Feb. 16, 1982) that most electrical installations have one or more circuits with wire resistance length of 250 feet and greater. Most of those installations were found to have one or more circuits with wire resistance length greater than 500 feet.

Due to the high temperature of the electrical arcs produced by electrical shorts (an electric welder, which is a form of controlled arcing, produces temperatures of 16,000 degrees F. at the point of arcing), only a fraction of a second is needed to start an electrical fire.

It is believed that electrical wiring short circuits have become the leading cause of fire in homes and office buildings due to the inability of the circuit breaker to disconnect the circuit after it shorts, before an electrical fire is started. Most short circuit overloads are due to a heat source or mechanical friction which breaks down the wire installation allowing the wiring conductors to short together. This belief has been confirmed by testing which shows that most homes and businesses (new or old) have one or more electrical circuits which, when shorted out, would require more than 10 seconds to trip the circuit breaker.

Some common places for heat related damage to wiring insulation to occur are:
 lighting fixtures;
 appliance internal wiring;
 overloaded extension cords; and,
 outlets which become warm.

Some common places for mechanical damage to the wiring insulation to occur are:
 strain relief at electrical junction boxes;
 electrical wiring staple fasteners;
 appliance cords; and,
 extension cords.

Extension cords further compound the circuit breaker problem. A 50 foot extension cord adds approximately 0.8 ohms which is equivalent to adding 250 feet of #12 wire onto the outlet wire resistance length, whereas a 100 foot extension cord adds 500 feet. With this added resistance, it is very difficult, if not impossible, for the circuit breaker to trip when an extension cord shorts out.

Conventional circuit breakers are designed to intentionally delay tripping for variable periods of time: 10 minutes at 150% overload to 0.1 seconds at 1,600% overloads (See Table 2). Accordingly, breakers will conduct overload currents for substantial intervals in excess of the normal circuit breaker rating. This delayed breaker action is sold as a feature which prevents tripping during start-up surge currents in excess of the breaker's rating. Due to this delayed tripping action, conventional circuit breakers cannot distinguish between motor start-up currents and intermittent high resistance short circuit conditions which are a primary cause of electrical fires.

Although the wiring size and circuit breaker rating may be correctly selected for a power distribution circuit, the power conductors nevertheless may be damaged by abnormal load conditions which fail to trip the circuit breaker, for example a low resistance intermittent short or a high resistance electrical short. Intermittent shorts are particularly dangerous and may occur in supply conductors of the kind used for domestic appliances which are subjected to frequent bending, as a result of which the insultation between the two supply conductors becomes damaged and allows momentary contact, so that an arcing, intermittent short circuit condition occurs.

Interconnection resistance caused by defective connections also contributes to electrical wiring fires. Faulty connections may be found at wire nuts, barrier strip junctions, receptacle connections and fuse box connections. Other sources of poor connections are bad internal contacts of a circuit breaker or switch. The problem of interconnection resistance is aggravated by the use of aluminum wiring. Aluminum wiring is subject to accelerated damage from overloads, poor connections and physical damage because of the electroylsis of junctions induced by dissimilar metal reaction. Moreover, thermal expansion and contraction cause the connections to become loose. As connections become loose, the contact resistance increases due to the reduced pressure, with intermittent arcing contact ultimately occurring as the connectors separate.

Installation of an oversized circuit breaker may also contribute to circuit overload. An oversized breaker may be installed when the correct size is not available or when the original breaker repeatedly trips. Overrating may also occur as a result of a defective breaker which will not trip. That situation is particularly dangerous since it is generally assumed (incorrectly) that an electrical circuit can be safely loaded until the circuit protector trips.

Conventional circuit breakers are not responsive to intermittent short circuit conditions and high resistance short circuit conditions as discussed above. That is, conventional, resettable circuit breakers which have a thermal-magnetic delayed trip feature are designed to accommodate mild overloads to avoid nuisance tripping, and will tolerate extreme intermittent short circuit conditions and extreme high resistance short circuit conditions which are a primary cause of electrical fires.

DESCRIPTION OF THE PRIOR ART

Conventional circuit breakers employ movable contacts to disconnect load circuits under specified overload conditions quickly and without excessive arcing. A circuit breaker in common use is the low voltage air circuit breaker, generally designed for use on low voltage AC circuits up to about 600 volts. In the air circuit breaker, a bridging member, operated by a linkage system, maintains fixed and movable contacts under heavy pressure in the "ON" position. Resettable breakers may be tripped to the "OFF" position by hand or through electromechanical action.

Movable contact circuit breakers have their contacts held in the "ON" position by means of a spring loaded catch. The catch can be released by the action of an electromagnet or by the movement of a bimetallic strip. When this happens, the catch is released and the contacts spring open, thereby disconnecting the circuit.

The tripping action of the bimetallic strip is produced by its mechanical motion which releases the spring loaded catch. This mechanical motion is due to heat which is produced by the line current passing through the resistance of the bimetallic strip. The delayed tripping action of the breaker is due to the cumulative heating action required to deflect the metallic strip after an overload has occurred. The breaker can normally be reset to its "ON" position by a mechanical lever.

Ground fault circuit interrupters (GFI) are of the electromechanical, movable contact category of circuit interrupters, or circuit breakers. The GFI circuit reduces the hazard of electrical shock but does not aid in the prevention of electrical fires. The ground fault interrupter (GFI) includes an electronic circuit which compares current flow in the power conductor to the current flow in the neutral conductor. When a misbalance of only a few milliamperes is detected, the ground fault interrupter circuit activates a solenoid which mechanically moves the bimetallic strip, which in turn releases the spring loaded catch, thereby disconnecting power. The ground fault interrupter is designed for the detection of conventional wire-to-ground faults but does not detect overload current conditions.

OBJECTS OF THE INVENTION

The principal object of the present invention is to provide an improved protector circuit for automatically overriding the trip delay of a circuit breaker when intermittent or high resistance shorts occur, yet not tripping the circuit breaker for normal start-up surge current loads.

Another object of the invention is to provide an improved protector circuit for automatically triggering a ground fault interrupter in response to short circuit conditions, wherein the ground fault interrupter disconnects the circuit.

A related object of the invention is to provide an improved circuit for automatically overriding the trip delay of a resettable circuit breaker in response to intermittent arcing conditions.

Yet another object of the invention is to provide an improved protector circuit for automatically overriding the trip delay of a circuit breaker in a variable period of time in response to a short circuit condition.

Still another object of the invention is to provide an improved protector circuit for opening a power switch in a power circuit in response to AC or DC current overload in a monitored power conductor.

SUMMARY OF THE INVENTION

The foregoing objects are achieved by a short circuit protector which is responsive to the magnitude of instantaneous current flow through a conductor to produce a control signal which actuates a solenoid which in turn trips a circuit breaker when current flow in the monitored conductor exceeds a predetermined maximum allowable current value for a specified period of time.

In one embodiment, the control signal, normally used to control the solenoid, is utilized for automatically triggering a ground fault interrupter (GFI) or solid state circuit breaker in response to short circuit conditions. In the ground fault interrupter embodiment, the solenoid control signal is utilized to deliberately misbalance the power wire current versus the neutral wire current by diverting an amount of power wire current through a resistor to ground, thereby misbalancing the ground fault interrupter. The resultant current imbalance is detected instantaneously by the GFI circuit, which generates an internal electronic trip signal to a solenoid which mechanically disconnects electrical power.

The novel features which characterize the invention are defined by the appended claims. The foregoing and other objects, advantages and features of the invention will hereinafter appear, and for purpose of illustration of the invention, but not of limitation, exemplary embodiments of the invention are shown in the appended drawings.

BRIEF DESCRIPTION OF THE DRAWINGS

FIGS. 13 and 14 illustrate how the short circuit detector of FIG. 7 can be utilized in combination with a GFI circuit breaker or GFI service outlet;

FIG. 15 is an application diagram which illustrates how the short circuit detector of FIG. 8 can be used in combination with a ground fault interrupter (GFI) device;

FIG. 16 is an application diagram which illustrates how the short circuit detector of FIG. 8 can be used in conjunction with an AC or DC solenoid for mechanically tripping a circuit breaker;

FIG. 17 is an application diagram which illustrates an alternative method for converting a monitored current into a proportional control voltage in the short circuit detector of FIG. 8; and, FIG. 18 is an application diagram which illustrates how the short circuit detector of FIG. 8 can be used with both AC and DC line voltages.

DETAILED DESCRIPTION OF THE PREFERRED EMBODIMENTS

Figure 1:
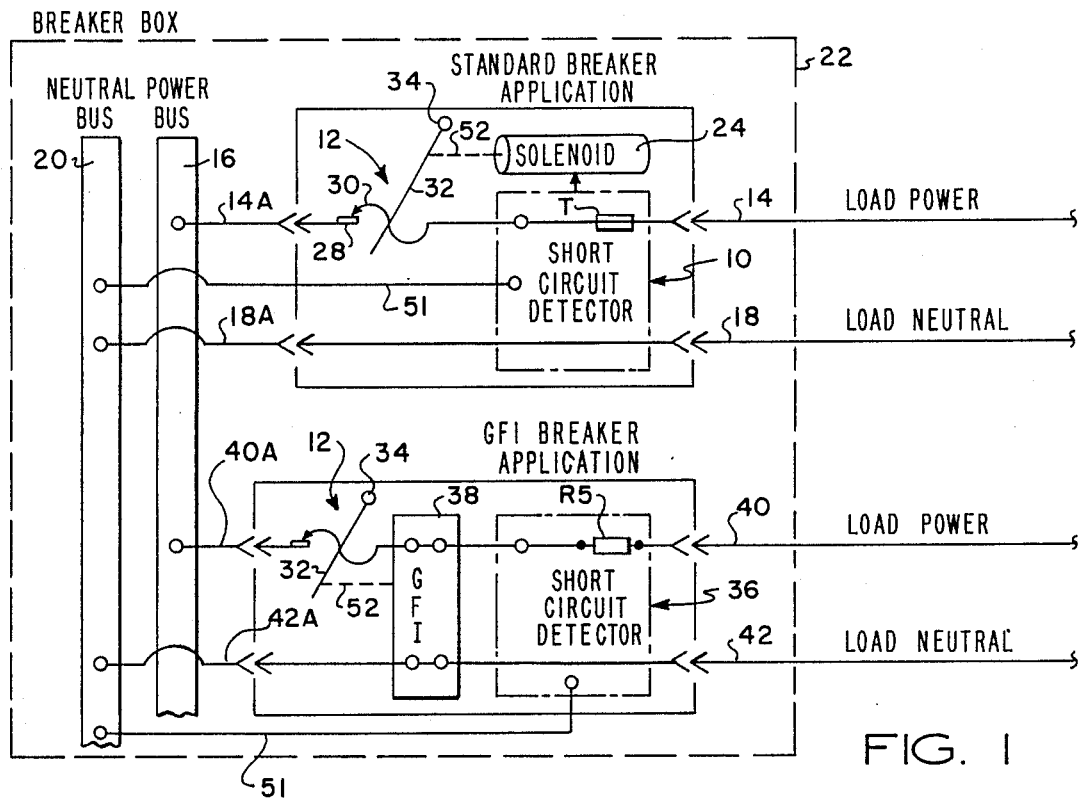
FIG. 1 is a simplified block diagram of a power distribution circuit in which a first embodiment of the short circuit protector of the invention is shown in combination with a resettable, thermal-magnetic circuit breaker, and a second short circuit protector embodiment is shown in combination with a resettable ground fault interrupter (GFI) circuit breaker.

In the description which follows, like parts are marked throughout the specification and drawings with the same reference numerals, respectively Referring to FIG. 1, a short circuit protector 10 constructed according to a first embodiment of the present invention is interconnected with a resettable, thermal-magnetic circuit breaker 12 in an active, alternating current power distribution circuit. The power distribution circuit includes a load power conductor 14 which is connected through the breaker 12 to a panel power conductor 14A which is connected to an AC power bus 16. Load current is returned by a load neutral conductor 18 and a panel neutral conductor 18A which is connected to a neutral bus 20 within a power distribution breaker box 22.

The thermal-magnetic circuit breaker 12 is a single pole, resettable switch having a thermally responsive bimetal element and magnetic pole piece for thermal-magnetic tripping. In this embodiment, the breaker 10 is tripped by a solenoid 24 which is actuated by a control signal 26 produced by the short circuit detector 10. The resettable breaker 12 includes a fixed power contact 28 electrically connected to the panel power conductor 14A and a movable power contact 30 which is electrically coupled to the load power conductor 14. The movable power contact 30 is mechanically coupled to a spring loaded mechanical catch 32. The spring loaded mechanical catch 32 is mechanically coupled to a bimetallic strip which deflects in response to excessive current flow through the load power conductor 14. When this occurs, the catch 32 is released and the movable contact 30 is moved out of engagement by a tension spring. The breaker 12 can be reset from "trip" to an "off" position and to an "on" position by manually moving a switch handle 34 which is attached to the catch 32.

The purpose of the short circuit protector 10 is to override the thermal trip delay to cause the circuit breaker 12 to trip, upon detection of current flow through the load conductor 14 which exceeds a predetermined maximum current overload level. That is, the purpose of the short circuit protector 10 is to override the inherent delay of the resettable breaker 12 to cause it to trip automatically upon detection of abnormal intermittent overload conditions such as an intermittent arcing short.

Also illustrated in FIG. 1 is a short circuit protector 36 which is an alternative embodiment of the invention for use in combination with a ground fault interrupter (GFI) circuit 38. In this arrangement, the ground fault interrupter circuit 38 is interconnected with a thermal-magnetic resettable breaker 12 to provide ground fault protection in addition to overload protection. In this embodiment, the short circuit detector 36 deliberately misbalances the current flowing through a load power conductor 40 relative to the current flowing through the load neutral conductor 42 by dividing current from the load power conductor 40 into the ground return conductor 51 in response to current flow through the load power conductor which exceeds a safe operating level The resulting current imbalance is detected instantaneously by the GFI circuit 38, which generates an internal electronic trip signal. The internal trip signal actuates a solenoid which mechanically trips the thermal-magnetic circuit breaker 12, thereby interrupting current flow through the load power conductor 40.

Figure 2:
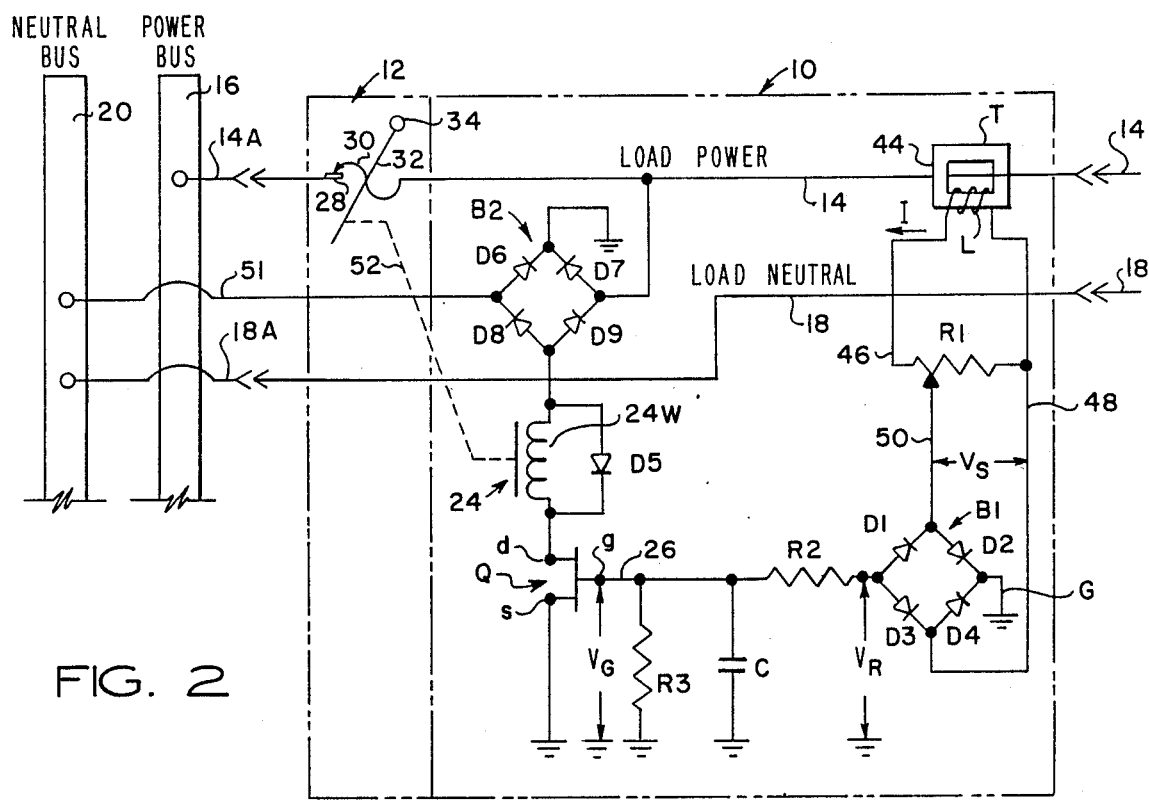
FIG. 2 is a schematic circuit diagram which corresponds with the resettable, thermal-magnetic circuit breaker application of FIG. 1.

Referring now to FIG. 2, the short circuit protector 10 is inductively coupled to the load power conductor 14 by a toroid transformer T. The load power conductor 14 is physically routed through the central opening of toroid transformer core 44. The transformer T includes a winding L, for example 500 turns wound about the toroid core 44. The purpose of the toroid transformer T is to transform AC load current conducted through the load power conductor 14 to an AC input voltage waveform $V_S$. Magnitude changes in the current flowing through the load power conductor 14 induce magnetic flux changes within the toroid core 44. The time rate of change of magnetic flux through the magnetic core 44 produces an input current signal I in the winding L which flows through input conductor 46. The alternating input signal current I is conducted through a gain control resistor R1, which is a variable potentiometer. The input circuit is completed by an input conductor 48 which is connected to the transformer winding L. According to this series connected arrangement, the AC load current conducted through the load power conductor 14 is converted to an AC voltage waveform which is dropped across the variable resistor R1.

The variable resistor R1 includes a wiper arm 50 which is adjusted to select the percent of the transformed AC voltage waveform $V_S$ which is applied as an input to a bridge rectifier B1. The bridge rectifier B1 is a full wave rectifier which converts the scaled AC voltage input waveform $V_S$ to a rectified DC output voltage $V_R$.

The bridge rectifier B1 includes four diodes D1, D2, D3 and D4 which are interconnected in a full wave bridge rectifier circuit. Input signal conductors 48, 50 are connected across the input terminals of the bridge B1, and one output terminal of the bridge is connected to a common connection point G. The other output terminal of the bridge B1 is connected to an RC integrator circuit formed by a resistor R2 and a capacitor C. The integrator circuit has an RC time constant which suppresses noise spikes and thereby reduces false triggering associated with start-up current transients.

Capacitor C is charged by the ripple output voltage $V_R$. Due to the diode action of the bridge B1, the capacitor C is not discharged when the bridge output voltage $V_R$ returns to zero. Hence, the combination of the bridge rectifier B1 and capacitor C performs a sample and hold function.

A resistor R3 is connected in shunt across the capacitor C. The combination of resistor R3 with resistor R2 produces a voltage divider, thereby yielding a scaled DC input voltage $V_G$ which is applied as the control signal 26 to the control gate terminal g of a normally open switch Q. The resistor R3 partially discharges capacitor C after each half cycle. This aids in setting the number of over current half cycles required to turn on switch Q. Resistor R3 also discharges capacitor C to the reset state after the circuit breaker 12 has tripped.

The switch Q is an insulated gate field effect transistor (FET) which has a switched drain power terminal d and an unswitched source power terminal s. The FET switch Q turns on to the conductive state when the potential $V_G$ of the gate input signal 26 exceeds the gate threshold voltage of transistor Q. Capacitor C charges to a level substantially equal to the voltage divider of R3/(R2+R3) times the peak magnitude of the bridge output voltage $V_R$. The values of resistor R2, resistor R3 and the adjusted value of variable resistor R1 are carefully selected to yield a gate threshold voltage $V_G$ equal to the turn on voltage of transistor switch Q in response to a predetermined current flow through the load power conductor 14, for example, corresponding to the maximum short circuit current rating of the service circuit.

The maximum short circuit current rating may be determined with reference to the current rating as published by the National Electrical Code Council for the electrical service out let or breaker through which the load current is distributed. For electrical service outlets, the NEC data given in Table 3 may be used to determine the maximum short circuit overload current value. During manufacture, the load power conductor 14 within the short circuit protector 10 is connected to a controlled current source to conduct current at the rated level. The wiper arm of resistor R1 is then adjusted to produce a gate threshold voltage $V_G$ to cause turn on of the transistor switch Q.

In the FIG. 2 embodiment, the short circuit protector 10 includes the solenoid 24 having an armature winding 24W connected in electrical series circuit relation with the switched and unswitched power terminals d, s of field effect transistor switch Q. The armature of the solenoid 24 is movably coupled to the control arm 32 of the thermal-magnetic circuit breaker 12 by mechanical linkage 52. A diode D5, connected in shunt across the solenoid winding 24W, provides a discharge path for the solenoid winding's collapsing magnetic field. Diode D5 suppresses high voltages which could otherwise damage the transistor switch Q.

The solenoid 24 is energized through a bridge rectifier B2. The bridge rectifier B2 includes four diodes D6, D7, D8 and D9 interconnected in a full wave bridge rectifier circuit. The input terminals of the bridge rectifier B2 are connected to the load power conductor 14 and a panel neutral conductor 51, respectively. According to this arrangement, actuating current is conducted through the solenoid winding 24W by the transistor switch Q on both half cycles of the applied AC power waveform. The output terminals of the bridge rectifier B2 are connected to ground G and to the solenoid 24, respectively.

During service operation of the power distribution circuit, current is conducted through the load power conductor 14 and returned through load neutral conductor 18 within the rated current overload range of the breaker 12. As a result of such current flow, the capacitor C is charged to an average DC voltage level less than the threshold turn-on voltage of transistor switch Q. Consequently, transistor switch Q remains open during normal current flow, including expected overload current excursions within the overload range of the breaker 12. In the absence of a turn-on signal 26 of sufficient magnitude to cause transistor switch Q to turn on, the solenoid 24 is not energized, and the thermal-magnetic breaker 12 operates as a conventional, resettable breaker. That is, the short circuit protector 10 does not interfere with the normal operation of the thermal-magnetic breaker 12, which provides resettable power distribution service.

However, at the onset of an overload condition in which the current conducted through the load power conductor 14 exceeds a predetermined safe value, for example the maximum short circuit current rating of the power distribution circuit as published by the National Electrical Code Council, the voltage across the charging capacitor C increases until it reaches a level $V_G$ which exceeds the turn-on threshold voltage of the transistor switch Q. The time constant of the charging circuit defined by resistors R2, R3 and capacitor C is selected to provide a delay of the rise of the voltage on the gate g of switch Q to the turn-on level $V_G$. Consequently, the voltage $V_G$ appearing across charging capacitor C rises to its final value after a predetermined delay interval. When the threshold level is exceeded, transistor switch Q turns on, solenoid 24 actuates and the thermal circuit breaker 12 is tripped, thereby interrupting power distribution.

Various applications of the short circuit protector (SCP) may have different delays. For example, for zoned protection a circuit breaker may have a delay of one second; a wall outlet may have a delay of ½ second; and, an extension cord application may have a delay of 0.1 second.

Figure 3:
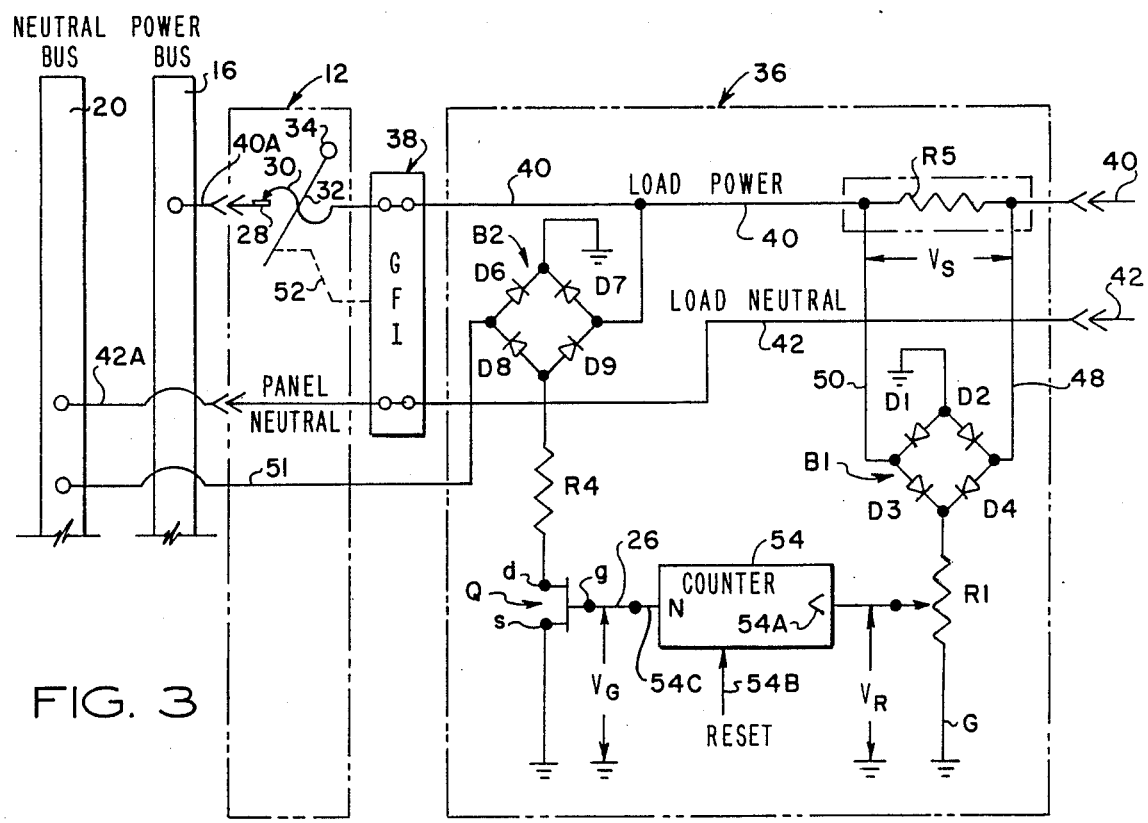
FIG. 3 is a schematic circuit diagram which corresponds with the GFI circuit breaker application of FIG. 1.

Preferred values of the circuit components shown in FIG. 2 are as follows:
Circuit breaker 12: Single pole—120/240 volts AC—20 amps, Cutler-Hammer Catalog No. CH120
Transformer T: toroid core with a winding L of 500 turns R1: 1,000 ohms potentiometer
Diodes D1, D2, D3 and D4: 50 volts at 0.5 amps
R2: 1,000 ohms, ¼ watt
C: 0.1 UF, 50 volts
R3: 1M ohm, ¼ watt
Transistor Q: FET, 250 V at 100 ma
Diodes D5, D6, D7, D8 and D9: 400 V at 0.5 amps The capacitor C in combination with the voltage divider provided by resistors R2, R3 provides a sample and hold function. The sample and hold function is also performed by a countercircuit 54 as shown in the embodiment of FIG. 3.

The counter circuit 54 is organized as a N-stage decade counter having N decoded outputs numbered O-N, respectively The counter circuit 54 inputs include a pulse count input 54A, a reset input 54B and an output terminal 54C. The counter circuit 54 preferably includes N binary stages interconnected in an N-stage Johnson decade counter arrangement. The binary stages are advanced one count in response to each positive input signal transition corresponding to the occurrence of each half cycle of the full wave bridge rectifier output waveform $V_R$. The counter 54 also includes an input comparator logic circuit which conducts only those bridge output signal $V_R$ pulses which exceed a predetermined threshold level corresponding with detection of an abnormal overload condition. The binary outputs of the binary stages are decoded and converted to decimal by an array of logic gates and inverters. After a predetermined count of N input pulses, the last stage N of the counter 54 rises to a logic high voltage level, for example 5 volts DC, and remains at the logic high voltage level until power is disconnected by the action of the GFI 38 actuator arm 52 on the breaker arm 32.

Counter circuit 54 delivers a gate turn-on signal 26 at a turn-on voltage level $V_G$, for example 5 volts DC, after a predetermined number N of overload $V_R$ pulses have been counted, for example N=3. In one arrangement, the count N varies inversely with the magnitude of the overload, with a smaller count corresponding with a larger current overload. In the FIG. 3 embodiment, the capacitor C is eliminated, and the counter 54 is connected in series between R2 and the gate terminal of transistor switch Q. The purpose of the variable counter circuit 54 is to more accurately distinguish between temporary reactive loads and true intermittent shorts.

Although the voltage divider and charging capacitor circuit is preferred in the FIG. 2 embodiment, the short circuit protector circuit 10 can be simplified by eliminating resistors R2, R3 and charging capacitor C. In the simplified circuit, the output of the diode bridge B1 is connected directly to the gate of transistor switch Q. However, the simplified circuit is more susceptible to power line transients since the noise filter effect of R2 and C is eliminated in the simplified design.

Further simplification can be achieved by eliminating bridge B1 and connecting the output of coupling resistor R1 directly to the gate g of transistor switch Q.

The performance of the short circuit protector of the present invention can be improved by the connection of a multi-stage filter, including both active and inactive filters, counter based filters and microprocessor based filters between the output of the diode bridge B1 and the gate input of transistor switch Q. Moreover, an active sample and hold circuit may be used in place of the passive sample and hold circuit provided by resistors R2, R3 and charging capacitor C.

While the transistor switch Q is preferably a field effect transistor, other AC switches such as a triac or a silicon control rectifier (SCR) may be used to good advantage. The triac and SCR each normally require a snubber filter to overcome reverse triggering.

The toroid transformer T, resistor R1 and diode bridge B1 in combination define an AC current to DC voltage converter. That is, the toroid transformer T senses the magnitude of current flowing through the load power conductor 14, with the variable resistor R1 and diode bridge B1 producing a DC voltage output signal $V_R$. It will be appreciated that the AC current to DC voltage conversion can be performed by other circuits, for example a resistor connected in series relation in the load power conductor 14 which is directly coupled to a full wave bridge rectifier circuit, or which is indirectly connected to a full wave bridge rectifier circuit through a transformer.

Referring now to FIG. 3, the short circuit protector 36 is connected in combination with a ground fault interrupter (GFI) circuit 38 which provides ground fault protection in addition to the overload protection provided by the thermal-magnetic circuit breaker 12. The short circuit protector 36 is comparable to the short circuit protector 10 shown in FIG. 2, except for the substitution of a resistor R4 in place of the parallel connected solenoid 24 and diode D9, the substitution of counter 54 for the passive sample and hold circuit provided by R2, R3 and C, and the substitution of resistor R5 for the toroid transformer T.

The value of resistor R4 is 1K ohms, ¼ watt. The value of resistor R5 is 0.05 ohms, 50 watt. The resistor R5 is connected directly in series within the load power conductor 40, and produces an alternating voltage $V_S$ in response to the flow of current through the load power conductor. In this alternative embodiment, the input voltage $V_S$ is applied to the input terminals of the full wave bridge rectifier B1, and gain control is provided by the resistor R1 which is connected across the output terminals of the full wave bridge rectifier B1. The output voltage $V_R$ is developed across the wiper arm of the variable resistor R1 and is connected to the pulse input 54A of the counter 54.

The purpose of resistor R4 in the FIG. 3 embodiment is to deliberately misbalance the current flowing through the load power conductor 40 relative to the current flowing through the load neutral conductor 42 in response to current flow through the load power conductor 40 which exceeds the maximum short circuit current rating of the power distribution circuit as determined by the wiring conductor size and the electrical service outlet current rating.

After a predetermined number N of overload half cycles through load power conductor 40, a gate threshold turn-on voltage $V_G$ is produced by the counter 54 at the gate terminal g of transistor switch Q, which causes the transistor switch Q to turn on. When transistor switch Q turns on, positive excursions of load current are conducted through diode D7 of the full wave rectifier bridge B2 through the ground conductor G and transistor Q and is returned through diode D8 to the panel neutral conductor 51. Negative excursions of the applied AC power waveform are similarly diverted through diode D9, resistor R4, transistor Q, and thence returned through ground G and diode D6 to the panel neutral conductor 51.

Accordingly, a fraction of the load current is diverted through resistor R4 for both positive and negative half cycles of the applied AC waveform. The ground fault interrupter 38 includes a detector which is sensitive and responsive to small differences in the current flowing through the load power conductor 40 relative to the current flowing through the load neutral conductor 42. The resulting current imbalance created by current flow diverted through R4 is detected instantaneously by the GFI circuit 38, which generates an internal electronic trip signal. The internal electronic trip signal actuates a solenoid 24 through linkage 52 which mechanically trips the thermal-magnetic circuit breaker 12, thereby interrupting current flow through the load power conductor 40.

According to the foregoing arrangement, the thermal trip delay normally provided by the thermal-magnetic circuit breaker 12 is overridden by the action of the short circuit protector 36 in response to an abnormal current overload condition of the kind produced by an intermittent arcing short circuit. For normal service operation, including operation within a normal overload range, the short circuit protector 36 remains on standby and does not interfere with normal GFI operation. According to this arrangement, the power distribution conductors 40, 42 are protected against intermittent, arcing short circuit conditions as well as normal current overload and line-to-ground faults.

Figure 4:
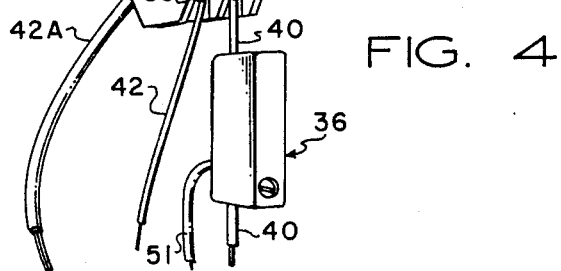
FIG. 4 is a perspective view of a retrofit installation in which a resettable GFI circuit breaker is protected by an externally mounted short circuit protector.

Referring now to FIG. 4, the short circuit protector 36 is connected to a thermal-magnetic circuit breaker 60 which includes a ground fault interrupter circuit 38 as illustrated in FIG. 3. In this embodiment, however, the ground fault interrupter circuit 38 is encapsulated within the housing 62 of the circuit breaker 60, and the short circuit detector 36 is connected externally to the load power terminal 64 of the circuit breaker 60. The load neutral conductor 42 is connected to the load neutral terminal 66 of the circuit breaker 60. In this arrangement, one input terminal of the diode bridge B2 is electrically connected to the neutral bus 20 by the panel neutral conductor 51. The embodiment of FIG. 4 is preferred for retrofit installations, and can be installed within the breaker box 22.

The ground fault interrupter circuit 38 is designed to provide ground fault protection for AC power distribution circuits. Ground fault currents greater than a presettable threshold value trigger an external SCR driven solenoid 24 to interrupt the AC load power line and neutral return conductor, as illustrated in the AC power outlet embodiment 70 of FIG. 5. In addition to detection of conventional hot wire to ground faults, neutral fault conditions are also detected. An example of a suitable ground fault interrupter for use in combination with the short circuit detector 36 is National Semiconductor Part No. LM1851.

Figure 5:
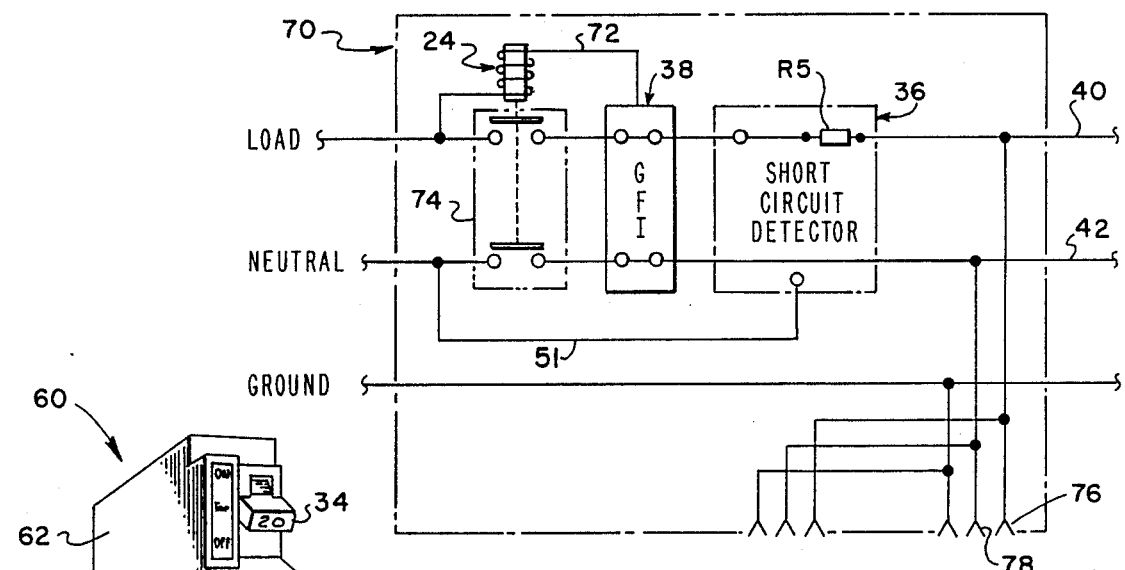
FIG. 5 is a simplified block diagram of a service outlet which is protected by a resettable GFI circuit breaker and the short circuit protector of the present invention.

Upon detection of a current flow misbalance, whether it is induced by a ground fault condition or deliberately by the short circuit detector 36 in response to an abnormal overload current condition such as an intermittent arcing short circuit, the ground fault interrupter 38 generates an internal trip signal 72, thereby actuating the solenoid 24 and tripping the circuit breaker 12, for the FIG. 3 embodiment, or opening the double pole contactor 74 in the service outlet 70 of the FIG. 5 embodiment. Upon opening of the contactor 74, current flow is interrupted to the load power receptacle 76 and the load neutral receptacle 78.

Figure 6:
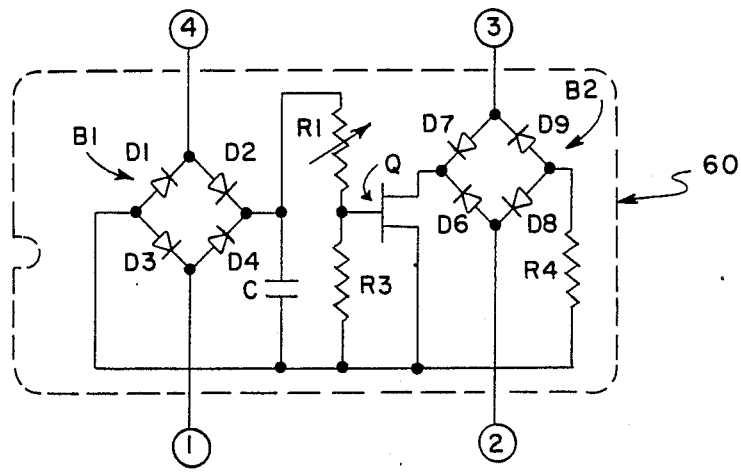
FIGS. 6, 7 and 8 are schematic circuit diagrams showing simplified alternative embodiments of the short circuit detector of the present invention.

Referring now to FIG. 6, a short circuit detector 60 is a simplified alternative embodiment of the detector circuitry shown in FIGS. 2 and 3. In this alternative embodiment, the short circuit detector 60 is fabricated on a printed circuit board having external pin connections 1, 2, 3 and 4. The short circuit detector 60 includes an AC to DC input signal converter (full wave bridge B1), a DC switch which can be triggered (FET transistor Q) and an output converter for switching either AC or DC loads (full wave bridge rectifier B2). Applications of the simplified short circuit detector 60 are shown in FIGS. 9, 10, 11 and 12. The short circuit detector 60 includes a capacitor C for storing voltage supplied by the current monitoring device, and an internal trim resistor R1 for presetting the DC switch trip point with respect to an externally applied signal. For manufacturing purposes, the trim resistor R1 should be of the laser trim type which further reduces manufacturing time and components.

Figure 7:
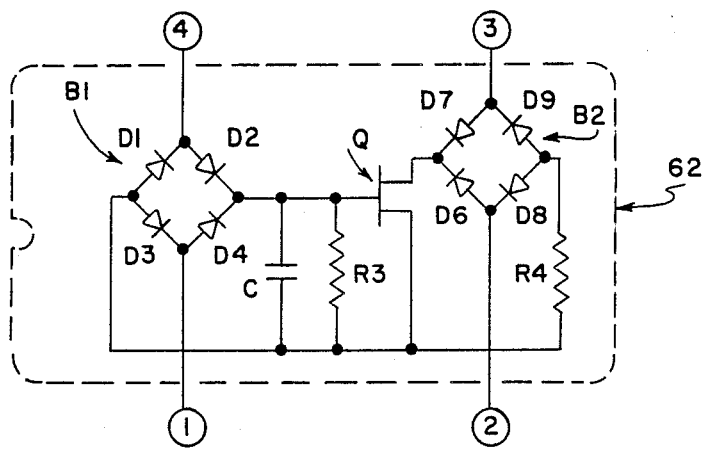

FIG. 7 illustrates an alternative embodiment of a short circuit detector 62 in which the number of internal components is reduced. The detector 62 is fabricated on a printed circuit board and includes external pins 1, 2, 3 and 4. Applications of the short circuit detector 62 are shown in FIGS. 13 and 14.

Figure 8:
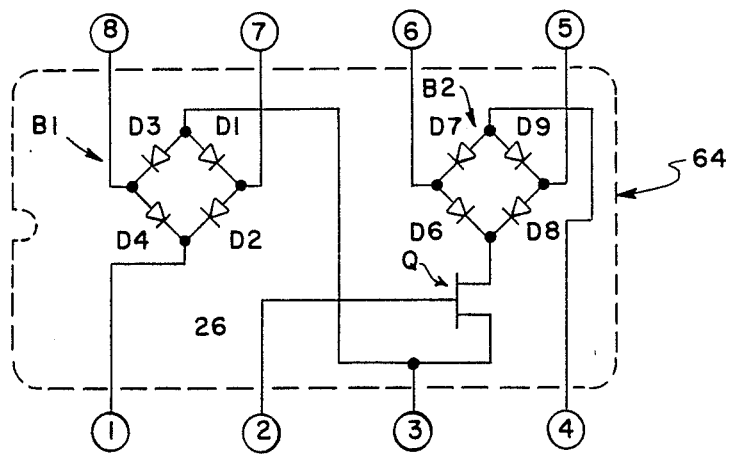
Figure 9:
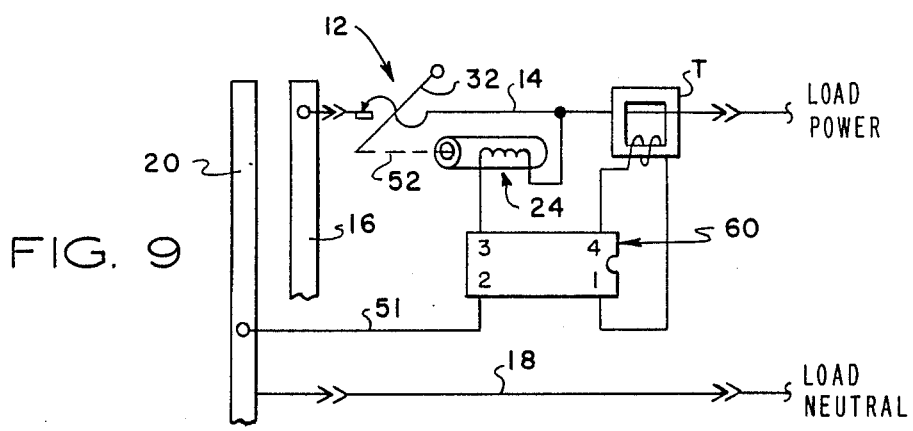
FIGS. 9, 10 and 11 illustrate different power distribution applications which are protected by the short circuit detector of FIG. 6.
Figure 10:
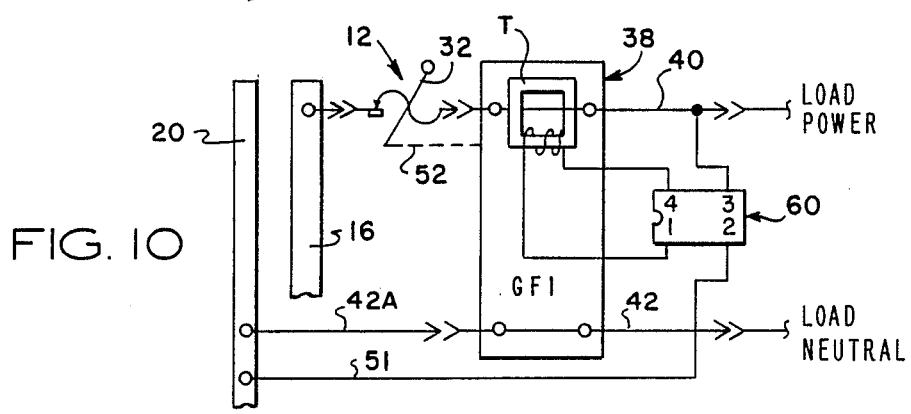
Figure 11:
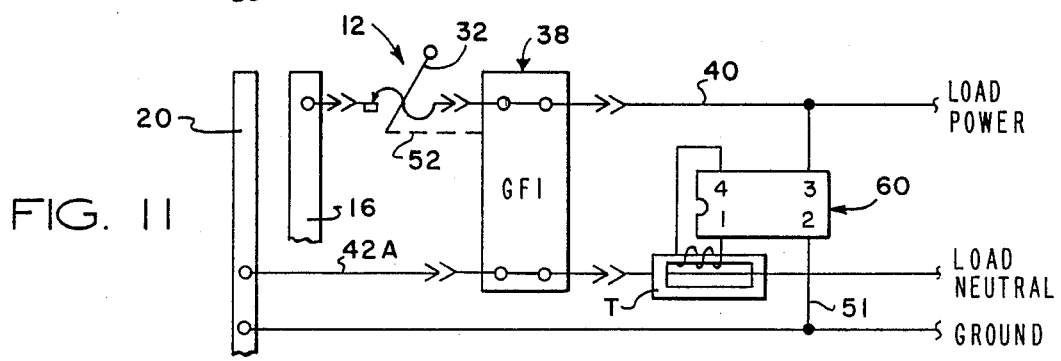
Figure 12:
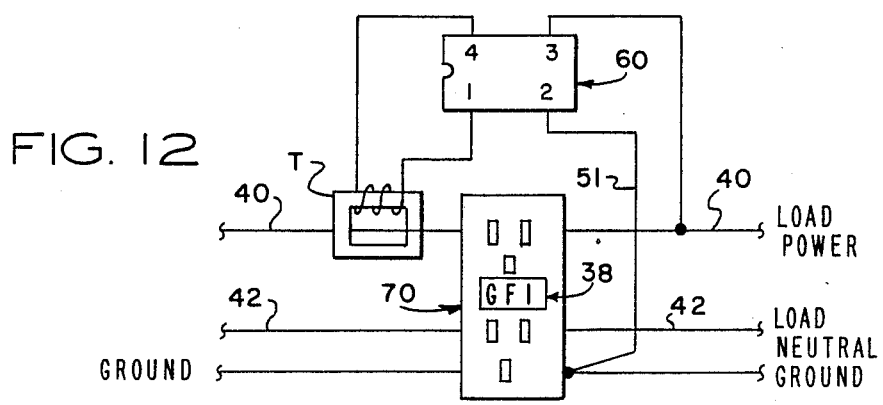
FIG. 12 illustrates how the short circuit detector of FIG. 6 can be used in combination with a GFI service outlet.

Another short circuit detector 64 is illustrated in FIG. 8. The short circuit detector 65 minimizes the number of internal components and includes an AC to DC input signal converter (full wave rectifier bridge B1), a DC switch which can be triggered (FET transistor Q), and an output converter (full wave bridge rectifier B2) for switching either AC or DC loads. Applications of the short circuit detector 64 are shown in FIG. 15, FIG. 16, FIG. 17 and FIG. 18. The short circuit detector 64 is fabricated on a printed circuit board having external connection pins 1-8 to which various combinations of external components may be connected, as shown in FIGS. 15-18.

In the short circuit detector 64 of FIG. 8, the input full wave rectifier B1 consists of diodes D1, D2, D3 and D4 which convert AC or DC input into DC which can be preconditioned prior to being applied to the input trigger of the DC transistor switch Q. Pins 7 and 8 are the bridge rectifier inputs which accept both AC and DC voltages from the current monitoring device (toroid transformer T or sensing resistor R5). Pins 1 and 3 are the bridge rectifier output terminals, where pin 1 may be connected directly to the input trigger of the DC switch. The input can be preconditioned with an analog or digital filter.

The voltage applied to the trigger input of the DC switch (pin 2 of FIG. 8) can be either an AC voltage or a DC voltage with respect to pin 3 of FIG. 8. Although the trigger input tolerates both AC and DC voltages, it will only trigger on a single polarity DC voltage. Accordingly, the input bridge rectifier D1 through D4 is needed to allow the trigger input to sample both half cycles of an AC voltage waveform.

It will be appreciated, therefore, that the short circuit protector of the present invention is effective for automatically overriding the trip delay of a circuit breaker in response to abnormal overload conditions such as a continuous short or intermittent short circuit arcing. Moreover, because of the sensitivity of the short circuit protector, the trip delay of a circuit breaker can be overridden instantly in response to intermittent as well as constant short circuit overloads. The short circuit protector of the invention may be used to good advantage in combination with a ground fault interrupter for automatically triggering the ground fault interrupter in response to dangerous current overload conditions, without otherwise interfering with normal operation of the resettable circuit breaker and without otherwise interfering with ground fault protection.

Although certain preferred embodiments of the invention have been described in detail, it should be understood that various changes, substitutions and alterations can be made therein without departing from the spirit and scope of the invention as defined by the appended claims.

TABLE 1

| Length | Circuit Resistance | Short Current | 20 Amp Circuit Breaker(2) | |
|---|---|---|---|---|
| | | | % of BKR Rating | Trip Delay(2) |
| (1)50 ft. | 0.162 ohms | 740 amps | 3700% | 0.008 seconds(3) |
| (1) | 0.193 ohms | 621 amps | 3100% | 0.008 seconds(4) |
| (1) | 0.201 ohms | 597 amps | 2980% | 0.008 seconds(5) |
| 100 ft. | 0.324 ohms | 370 amps | 1850% | 0.008 seconds(3) |
| | 0.386 ohms | 310 amps | 1550% | 0.010 seconds(4) |
| | 0.402 ohms | 298 amps | 1490% | 0.400 seconds(5) |
| 250 ft. | 0.810 ohms | 148 amps | 740% | 2.0 seconds(3) |
| | 0.965 ohms | 124 amps | 620% | 4.0 seconds(4) |
| | 1.005 ohms | 119 amps | 595% | 5.0 seconds(5) |
| 500 ft. | 1.620 ohms | 74 amps | 370% | 8.0 seconds(3) |
| | 1.930 ohms | 62 amps | 310% | 9.0 seconds(4) |
| | 2.010 ohms | 60 amps | 300% | 10.0 seconds(5) |
| 1,000 ft. | 3.240 ohms | 37 amps | 185% | 1.0 minutes(3) |
| | 3.860 ohms | 31 amps | 155% | 3.0 minutes(4) |
| | 4.020 ohms | 30 amps | 150% | 10.0 minutes(5) |
| 1,000 + ft. | For distances greater than 1,200 feet, the breaker may never trip when a short circuit is applied. | | | |

(1)Maximum distance recommended by NEC
(2)Cutler-Hammer (Eaton) Construction Industry Catalog, February 1986, Publication No. NL-200, p. 3
(3)1981 NEC book for solid #12 bare copper
(4)1987 NEC book for solid #12 bare copper
(5)1987 NEC book for solid #12 coated copper

TABLE 2

| TIME TRIP VS. CURRENT OVERLOAD | | | | |
|---|---|---|---|---|
| Breaker Overload | Trip Time | 20 Amp Breaker | 30 Amp Breaker | 60 Amp Breaker |
| 0% ... 135% | No Trip | 27 Amps | 40 Amps | 81 Amps |
| 150% | 10 Min. | 30 Amps | 45 Amps | 90 Amps |
| 200% | 30 Sec. | 40 Amps | 60 Amps | 120 Amps |
| 300% | 10 Sec. | 60 Amps | 90 Amps | 180 Amps |
| 900% | 1 Sec. | 180 Amps | 270 Amps | 540 Amps |
| 1,600% | 0.1 Sec. | 320 Amps | 480 Amps | 960 Amps |

TABLE 3

| OUTLET RATING VS. TRIP TIME FOR CONSTANT SHORTS | | | | |
|---|---|---|---|---|
| Outlet Rating | Short Ckt Current | Circuit Breaker Trip Time | | |
| | | 20 Amp | 30 Amp | 60 Amp |
| 1.0 Amps | 30 Amps | 10 Min. | No Trip | No Trip |
| 1.5 Amps | 45 Amps | 25 Sec. | 10 Min. | No Trip |
| 2.0 Amps | 60 Amps | 10 Sec. | 30 Sec. | No Trip |
| 3.0 Amps | 90 Amps | 7 Sec. | 10 Sec. | 10 Min. |
| 4.0 Amps | 120 Amps | 5 Sec. | 8 Sec. | 30 Sec. |
| 5.0 Amps | 150 Amps | 2 Sec. | 5 Sec. | 15 Sec. |
| 7.5 Amps | 225 Amps | 0.8 Sec. | 2 Sec. | 8 Sec. |
| 10.0 Amps | 300 Amps | 0.1 Sec. | 0.8 Sec. | 5 Sec. |
| 15.0 Amps | 450 Amps | 0.008 Sec. | 0.1 Sec. | 2 Sec. |
| 20.0 Amps | 600 Amps | 0.008 Sec. | 0.008 Sec. | 0.8 Sec. |
| 30.0 Amps | 900 Amps | 0.008 Sec. | 0.008 Sec. | 0.1 Sec. |
| 60.0 Amps | 1,800 Amps | 0.008 Sec. | 0.008 Sec. | 0.008 Sec. |

What is claimed is:

1. A protector circuit for automatically overriding the trip delay of a circuit breaker of the type having a movable contact arm for making and breaking an electrical circuit in a power distribution system having first and second power conductors, said protector circuit comprising, in combination:
   current to voltage transforming means having an input adapted to be coupled to a selected one of said power conductors for producing a control voltage output signal having a magnitude proportional to the magnitude of current conducted through said selected power conductor;
   a control solenoid having an actuator linkage member movably coupled to the movable contact arm of the circuit breaker and having an armature winding electrically coupled to conduct current from the first power conductor to the second power conductor; and,
   a gate controlled switch having switched and unswitched power terminals connected in series electrical relation with the armature winding of said control solenoid, said switch having a control gate terminal electrically coupled to said transforming means for receiving the control voltage output signal.

2. A protector circuit as defined in claim 1, including:
   an AC to DC voltage converter coupled to said transforming means for converting an AC control voltage output signal to a DC voltage control signal, said control gate terminal being electrically coupled to said converter for receiving said DC voltage control signal.

3. A protector circuit as defined in claim 2, wherein said AC to DC converter comprises a full wave bridge rectifier having first and second input terminals electrically coupled to said transforming means and having first and second output terminals electrically coupled to the gate control terminal and the unswitched power terminal, respectively, of the gate controlled switch.

4. A protector circuit as defined in claim 1, wherein said transforming means comprises a toroid transformer having a winding adapted for inductive coupling to the load power conductor.

5. A protector circuit as defined in claim 1, including a variable gain control resistor connected in series circuit relation with said transforming means, said variable resistor having a movable wiper arm for adjusting the magnitude of the control voltage input signal.

6. A protector circuit as defined in claim 1, including a voltage sample and hold circuit electrically coupling the control voltage signal output of said transforming means to the gate terminal of said gate controlled switch.

7. A protector circuit as defined in claim 6, wherein said sample and hold circuit comprises a resistor connected in series electrical relation between the control voltage output of said transforming means and the control gate of said switch, and a capacitor connected in parallel shunt relation across the gate terminal and the unswitched power terminal of said switch.

8. A protector circuit as defined in claim 6, wherein said sample and hold circuit comprises a counter having a pulse count input terminal electrically coupled to the control voltage signal output of said transforming means, and having an output terminal electrically coupled to the control gate of said switch, said counter being adapted to produce an output turn-on control signal in response to a predetermined count of control voltage signal pulses.

9. A protector circuit as defined in claim 1, including a full wave AC to DC bridge rectifier circuit having first and second input terminals connected to the first power conductor and to the second power conductor, respectively, and having first and second output terminals connected in series electrical circuit relation with the switched and unswitched power terminals of said gate controlled switch.

10. A protector circuit as defined in claim 1, wherein said current to voltage transforming means comprises a current sensing resistor connected in series electrical relation in said selected power conductor.

11. A protector circuit as defined in claim 10, including a full wave bridge rectifier having first and second input terminals electrically coupled across said current sensing resistor and having first and second output terminals electrically coupled to the switched and unswitched power terminals, respectively, of the gate controlled switch.

12. In a circuit breaker of the type having a movable contact arm for making and breaking an electrical circuit in a power distribution circuit having a first power conductor and a second power conductor, the improvement comprising a protector circuit for overriding the trip delay and tripping the movable contact arm to interrupt current flow through a selected one of said power conductors in response to current flow through said selected power conductor which exceeds a predetermined level, said protector circuit including a solenoid movably coupled to said contact arm for tripping said contact arm in response to an actuating control signal, a detector for detecting the magnitude of current flow through said selected power conductor, and means coupled to said detector for generating a solenoid actuating control signal in response to the detection of current flow through the selected power conductor which exceeds said predetermined level.

13. A protector circuit for automatically overriding the trip delay of a circuit breaker of the type having a movable contact arm for making and breaking an electrical circuit in a power distribution system having a power bus, a neutral bus, a load power conductor and a load neutral conductor and including a ground fault interrupter circuit electrically coupled to the load power conductor and to the load neutral conductor and having a solenoid movably coupled to the contact arm for interrupting current flow through the load power conductor in response to the detection of a predetermined difference in the magnitude of current flowing through the load power conductor relative to current flowing through the load neutral conductor, said protector circuit comprising, in combination:

current to voltage transforming means having an input adapted to be coupled to a selected one of said load power conductor and load neutral conductor for producing a control voltage output signal having a magnitude proportional to the magnitude of current conducted through the selected conductor;

a current diverting resistor electrically coupled to conduct current from the load power conductor to the neutral bus; and, a gate controlled switch having switched and unswitched power terminals connected in series electrical relation with said current diverting resistor, said switch having a gate terminal electrically coupled to said transforming means for receiving the control voltage output signal.

14. A protector circuit as defined in claim 13, including:

an AC to DC voltage converter coupled to the transforming means for converting an AC control voltage signal to a DC voltage control signal having a magnitude proportional to the magnitude of current flow through the load power conductor.

15. A protector circuit as defined in claim 14, wherein said AC to DC converter comprises a full wave bridge rectifier having first and second input terminals electrically coupled to said transforming means and having first and second output terminals electrically coupled to the gate control terminal and the unswitched power terminal, respectively, of the gate controlled switch.

16. A protector circuit as defined in claim 13, wherein said transforming means comprises a toroid transformer having a winding inductively coupled to said selected conductor.

17. A protector circuit as defined in claim 13, including a variable gain control resistor connected in series circuit relation with said transforming means, said variable resistor having a manually adjustable wiper arm for adjusting the magnitude of the AC control voltage signal.

18. A protector circuit as defined in claim 13, including a voltage sample and hold circuit electrically coupling the control voltage signal output of said transforming means to the gate terminal of said gate controlled switch.

19. A protector circuit as defined in claim 18, wherein said sample and hold circuit comprises a resistor connected in series electrical relation between the control voltage signal output of said transforming means and the control gate of said switch, and a capacitor connected in parallel shunt relation across the gate terminal and the unswitched power terminal of said switch.

20. A protector circuit as defined in claim 18, wherein said sample and hold circuit comprises a counter having a pulse count input terminal electrically coupled to the control voltage signal output of said transforming means, and having an output terminal electrically coupled to the control gate of said switch, said counter being adapted to produce an output turn-on control signal in response to a predetermined count of control voltage signal pulses.

21. A protector circuit as defined in claim 13, including a full wave AC to DC bridge rectifier circuit having first and second input terminals adapted to be connected to the load power conductor and to the load neutral conductor, respectively, and having first and second output terminals connected in series electrical circuit relation with said current diverting resistor and the switched and unswitched power terminals of said gate controlled switch.

22. A protector circuit as defined in claim 14, including a variable gain resistor connected in electrical series relation between one of the output terminals of said AC to DC voltage converter and the gate terminal of said gate controlled switch, said variable gain resistor having a wiper arm, said wiper arm being electrically coupled to the control gate of said switch.

* * * * *

UNITED STATES PATENT AND TRADEMARK OFFICE
CERTIFICATE OF CORRECTION

PATENT NO. : 4,949,214

DATED : 08/14/90

INVENTOR(S) : George A. Spencer

It is certified that error appears in the above-identified patent and that said Letters Patent is hereby corrected as shown below:

On the title page,
in the Abstract:

Line 5, "repsonse" should be -- response --.

Line 7, "overhead" should be -- overload --.

Column 6, line 38, "level The" should be -- level. The --.

Column 9, line 11, "countercircuit" should be -- counter circuit --.

Column 9, line 15, "respectively The" should be -- respectively. The --.

Signed and Sealed this

Fifth Day of May, 1992

Attest:

DOUGLAS B. COMER

Attesting Officer

Acting Commissioner of Patents and Trademarks